United States Patent Office 2,781,587
Patented Feb. 19, 1957

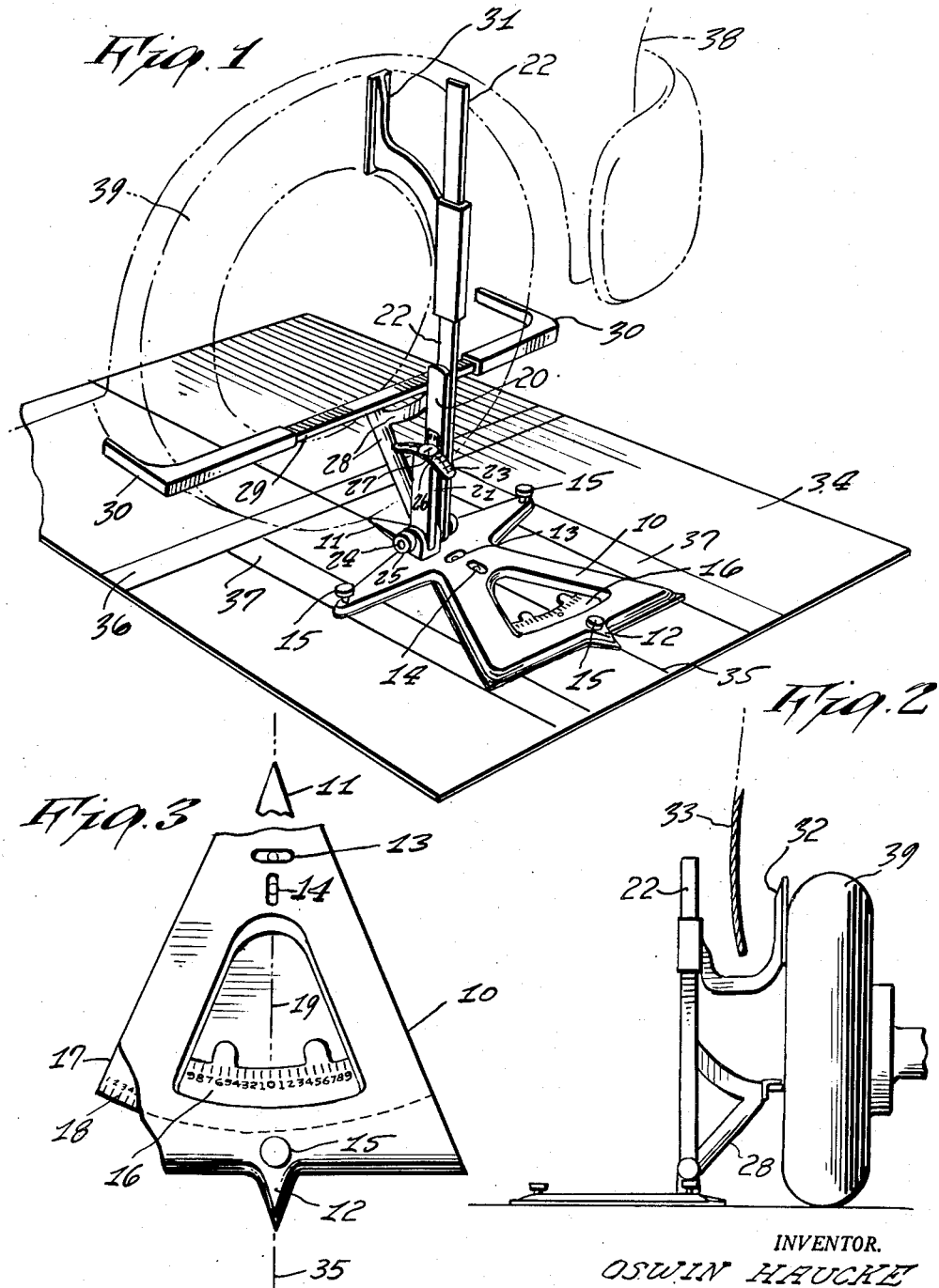

2,781,587
WHEEL ALIGNER

Oswin Haucke, Brooklyn, N. Y.

Application December 9, 1954, Serial No. 474,186

3 Claims. (Cl. 33—203.15)

This invention relates to wheel aligners and more particularly to wheel aligners used for checking the alignment of automobile wheels.

It is an object of this invention to provide a simple means for determining whether or not the wheels of an automobile are correctly aligned.

Another object of this invention is to provide an automobile wheel aligner which is not hampered by overhanging fenders.

A further object of the present invention is to provide a simple gauge for measuring on automobile wheels the camber angle, caster angle, toe-in, king-pin inclination, wheel base and other significant wheel angles and dimensions.

A still further object of the present invention is to provide a wheel alignment gauge of simple design which can withstand prolonged wear and tear.

Other and more specific objects of the present invention will be apparent from the following description as read in conjunction with the accompanying drawing, the novel features of this invention being pointed out in the claims at the end of the specification.

Figure 1 is a perspective view of the invention shown in operative use.

Figure 2 is a side view thereof wherein a modified member is attached so as to accommodate an overhanging fender.

Figure 3 is a fragmentary plan view of the base of the invention.

Referring in detail to the drawing, the embodiment of the invention therein shown comprises an automobile wheel alignment gauge having a planar base 10 with oppositely aligned indicia or pointers 11 and 12 integral therewith defining a longitudinal axis of symmetry, leveling means consisting of transverse and longitudinal levels 13 and 14 and suitable leveling screws 15. The said base 10 also has an opening through which may be viewed an angular gauge 16 incorporated on a plate 17, that is used to measure the angle between the axis 19 of the base 10 and a reference line 35 hereinafter described, said plate 17 also having a scale in angular graduations 18 calibrated along the outer peripheral edge, as seen in Figure 3.

It is to be noted that the base 10 is rotatable with respect to the plate 17, said rotation being pivoted about that point on the longitudinal axis 19 of the said base 10 and plate 17 which is centrally located with respect to three vertical members 20, 21 and 22.

The first of these vertical members 20 is integral with the base 10 and supports on its upper portion a number of fixed and adjustable angular scales 23 having graduations extending parallel to the base and defining suitable angular ranges to allow practical measurement of various alignment angles. The said first vertical member or support 20 rotatably secures the second vertical member 21 on a suitable shaft 24 which may be tightened by a nut 25 thereby inducing any desired frictional resistance to motion of the said second vertical member 21.

This member 21 also supports above the angular scales 23 a circular frame 26 which holds a glass with a suitable hairline 27 thus allowing the said scales 23 to be read with accuracy.

The said second vertical member or post 21 also incorporates a supporting arm 28 which in turn carries a graduated horizontal bar 29 having a movable L-shaped arm 30 at each end thereof, the positions of said arms 30 being determinable by reference to the said graduated bar 29. The said third vertical member 22 is secured to the second vertical member 21 and also carries a vertically adjustable tire contacting arm 31, this arm 31 being removable if desired. Upon such removal, the said contacting arm 31 may be replaced by a suitable curved tire contacting arm 32 which can accommodate an overhanging fender 33, as shown in Figure 2.

The above described device may be used in conjunction with an alignment plate 34 having a longitudinal centerline 35, a stripe 36 at right angles to the said centerline 35, and two stripes 37 parallel to and straddling the said centerline 35.

The following data may be ascertained with this invention:

Camber angle—the amount in degrees that the front wheels are inclined outward or inward.

Caster angle—inclination of king-pin axis from the vertical in a vertical plane parallel to the longitudinal axis of the vehicle.

King-pin—inclination of king-pin axis from the vertical in a vertical plane at right angles to the longitudinal axis of the vehicle.

Toe-in—the amount of inches the front wheels are closer together in front than in rear.

Toe-out on turns—the difference between the turning angle of the front wheels when the outer front wheel is set at a predetermined turning angle, such as 20 degrees.

Wheel base—the distance between center of front wheel and center of rear wheel.

Thus, in using the present device, the vehicle in question 38 is driven upon the alignment plate 34 with its front tire 39 upon the transverse stripe 36, as shown in Figure 1. With the vehicle 38 empty, camber angle may be determined by placing the alignment gauge against the tire approximately at its center, the horizontal bar 29 being in contact with the said tire 39 and the tire contacting arm 31 being brought into contact with the upper side wall of the front tire 39, the camber angle being indicated by the displacement of the hair line 27 from the zero mark on the camber scale which is one of the angular scales 23 mounted on the vertical member 20. The base 10 should be leveled by means of the leveling screws 15. Camber of the other wheels may be taken in the same manner.

The caster angle is read by turning the left wheel 20 degrees to the right and placing the alignment gauge against the tire 39 with the horizontal bar 29 being in contact with the said tire 39, the L-shaped arms being removed therefrom, and the tire contacting arm 31 contacting the upper side wall of the tire 39. The 20 degree turn may be accurately determined by noting the position of the sides of the base 10 since the angle formed by the two sides of the base 10 in the vicinity of the front pointer 11 is 40 degrees, the rear pointer 12 thus bisecting the said 40 degree angle into two 20 degree angles. Thus, if the tire 39 has been turned 20 degrees, one of the sides of the said base 10 should be parallel to the center line 35 of the alignment plate 34. This accomplished, the base 10 is leveled and the caster angle scale, which is also found among the angular scales 23 on the vertical member 20, is set at zero. The gauge is then removed, the wheel is turned to a 20 degree left turn, checked as before with the gauge in contact as above described, the base is leveled and the caster angle is read on the caster angle scale, the said reading being either positive or negative. The caster angle of the other wheel may be taken in the same manner.

King pin inclination is read by placing the gauge against the tire 39 in the same manner as set forth above, the tire being in a straight ahead position as checked by the base pointers 11 and 12 being located on the center line 35 of the alignment plate 34. The base 10 is leveled and the king pin inclination scale, which is formed among the angular scales 23 on the vertical member 20, is set with the hair line 27 at zero. Then the wheel is turned 20 degrees to the right, the base 10 is leveled and the king pin inclination scale is read. The wheel is next turned 20 degrees to the left, the base 10 is leveled and the king pin inclination scale is again read. The king pin inclination angle is then determined by adding the two readings. (If one of the readings is negative, subtract from the positive.)

Toe-in is read with one of the front wheels in a straight-ahead position, the wheel being placed in this position by placing the gauge in contact with the tire 39 as set forth above and turning the wheel until the front and rear pointers 11, 12 of the base 10, are located on the center line 35 of the alignment plate 34. The gauge is then taken to the opposite wheel, located on a similar alignment plate having its center line aligned with that of the first mentioned alignment plate 34; and the gauge is brought into contact with the said opposite wheel with its front pointer 11 on the center line. The distance between the center line and the rear pointer 12 is indicative of the toe-in of the front wheels.

Toe-out on turns may be determined by turning the outer front wheel 20 degrees, and then measuring the relative angle of the inner front wheel. The relative angle of the inner front wheel is measured by applying the gauge against the inner wheel, turning plate 17 relative to base 10, until the bisector of plate 17 is aligned with or parallel to center-line 35, the angle being read from the angular graduations 18 on plate 17, using the side of base 10 as an indicating index.

The wheel base is measured by centering the front tire 39 on the center line 35 of the alignment plate 34. The gauge is centered as to the front wheel by adjusting the L-shaped arms 30 in contact with the tire 39 so as to be equidistant from the center of the graduated bar 29. The gauge pointer 11 will then be at the center of the wheel. A similar procedure is carried out with respect to the rear wheel. The wheel base will then be equal to the distance, as measured by a ruler, between the two positions of the pointer 11.

The embodiment of the invention illustrated and described hereinabove has been selected for the purpose of clearly setting forth the principles involved. It will be apparent, however, that the present invention is susceptible of being modified in respect to details of construction combination and arrangement of parts which may be resorted to without departure from the spirit and scope of the invention as claimed.

Having thus described my invention, I claim as new and desire to secure by Letters Patent of the United States:

1. A gauge adapted to measure and adjust the alignment of vehicular wheels comprising a planar base having longitudinal and transverse leveling means, enabling the base to be disposed in a horizontal plane, said base including indicia defining a longitudinal axis of symmetry and opposing lateral edges, the prolongation of said lateral edges intersecting at a predetermined angle, in combination with a plate adjoining and parallel to the planar base, said plate and base being pivotally secured to each other about a common axis, whereby the plate can be rotated relative to the base about the said axis, said plate including a scale graduated to read the angular position of the plate with reference to a datum position, said base being normally superimposed over the plate and including a perforation whereby the said scale can be seen through the base, said plate also including a second scale parallel to the first said scale and spaced radically therefrom, one of the said edges being used as an index to read on the said second scale relative angular displacement of the plate and base, in combination with a vertical post normal to the base and located above the said common axis, said post being rotatably secured to the base about a fulcrum parallel to the base and perpendicular to the longitudinal axis, said post including means for contacting a vehicular wheel whereby the post can be adjusted parallel to the vertical wheel axis, in further combination with a support integral with and perpendicular to the base, a scale mounted on the support and indicating means secured to the post and cooperating with the last mentioned scale whereby angular displacements of the post relative to the support can be read by the position of the indicating means relative to the scale.

2. A gauge as in claim 1, wherein the lateral edges are each inclined 20° from the longitudinal axis, and the first said scale is graduated symmetrically from the center, said post including an upper vertical surface for contacting the vehicular side wall and a lower horizontal U-shaped bar for contacting the peripheral wearing surface of the tire along lines parallel to the horizontal axis of the wheel.

3. A gauge as in claim 1, wherein the third said scale has graduations parallel to the base and the support has a glass index with a hair line superimposed over the third said scale.

References Cited in the file of this patent

UNITED STATES PATENTS

| Re. 21,052 | Haucke | Apr. 18, 1939 |
| 2,256,968 | Wochner | Sept. 23, 1941 |
| 2,378,631 | Holmes | June 19, 1945 |
| 2,488,043 | Vigneron | Nov. 15, 1949 |
| 2,526,484 | Jacobsen et al. | Oct. 17, 1950 |

FOREIGN PATENTS

| 1,031,388 | France | Mar. 18, 1953 |